Nov. 13, 1928.

F. L. OHMER 1,691,668

SPEED-CONTROLLING DEVICE FOR MOTOR VEHICLES

Filed Dec. 8, 1921

2 Sheets-Sheet 1

Fig. 1.

INVENTOR.
F. L. OHMER.

Attorney

Nov. 13, 1928.   1,691,668
F. L. OHMER
SPEED CONTROLLING DEVICE FOR MOTOR VEHICLES
Filed Dec. 8, 1921   2 Sheets-Sheet 2

Inventor
F. L. OHMER.
By
Attorney

Patented Nov. 13, 1928.

1,691,668

UNITED STATES PATENT OFFICE.

FREDERICK L. OHMER, OF DAYTON, OHIO, ASSIGNOR TO JOHN F. OHMER, OF DAYTON, OHIO.

SPEED-CONTROLLING DEVICE FOR MOTOR VEHICLES.

Application filed December 8, 1921. Serial No. 520,848.

This invention relates to a speed controlling device for motor vehicles.

When a motor vehicle is driven by a person other than its owner, such as trucks, and other commercial vehicles, the owner may instruct the driver not to exceed a certain speed limit, but he has no way of knowing whether or not his instructions are carried out. The drivers are apt to take advantage of this situation and operate the vehicles at dangerous speeds, which not infrequently results in accidents for which the owner is held responsible, either by way of damages to other persons or by way of repairs to his own vehicle.

One object of the invention is to provide means for positively controlling the speed at which a motor vehicle may be driven.

Another object of the invention is to provide a device which will indicate to the driver the speed at which the vehicle is moving and will interrupt the operation of the engine whenever the speed exceeds the prescribed limit.

Another object of the invention is to provide such a device which will be simple in its construction and operation and which will not be easily disarranged or rendered inoperative.

Other objects of the invention will appear as the device is described in detail.

Figure 2:
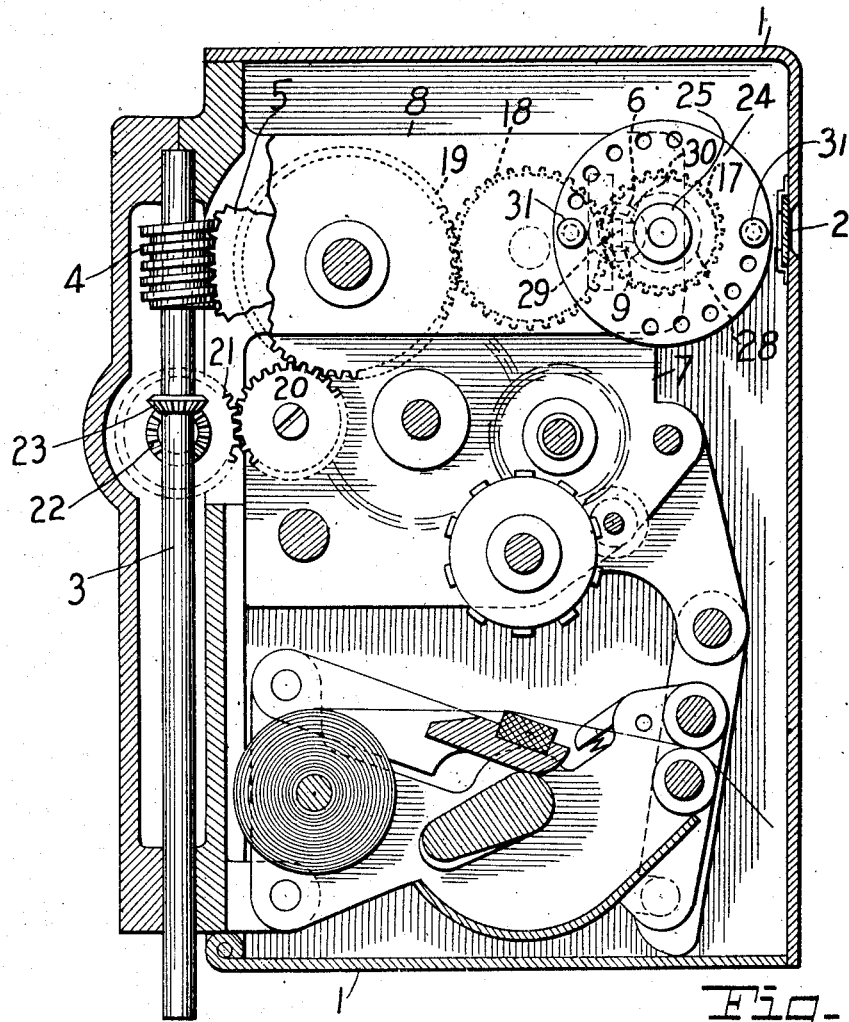
Figure 3:
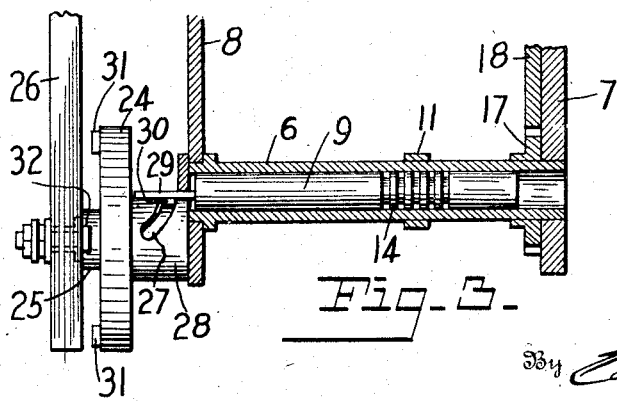

In the accompanying drawings Fig. 1 is a sectional view taken through the casing of a service recorder showing the present invention embodied therein; Fig. 2 is a section taken on the line 2—2 of Fig. 1; and Fig. 3 is a section taken on the line 3—3 of Fig. 1.

In these drawings I have illustrated one embodiment of my invention and have shown the same as forming a part of a service recorder of a well known construction, but it will be understood that the present invention may be used independently of this service recorder and may, if desired, constitute in itself a unit which may be applied to the vehicle independently of any other mechanism; and, further, it will be understood that the construction of the device here shown has been chosen for the purpose of illustration only and that it may take various forms.

As shown in these drawings the service recorder comprises a main casing 1 having in its front wall a sight opening 2, and having journaled at the rear thereof, a vertically arranged shaft 3 which is adapted to be connected by means of a flexible shaft, or the like, with a moving part of a vehicle, usually either one of the wheels or the driving shaft. The shaft 3 has at its upper end a worm 4 which meshes with a worm wheel 5 which drives certain recording devices forming a part of the service recorder, but which need not be here described inasmuch as they form no part of the present invention.

In order to control the speed at which the vehicle may be operated I provide a flyball governor which will be operated from the moving part of the vehicle, in the present instance, through the shaft 3, and which, when it reaches a predetermined speed, will actuate mechanism which controls the operation of the engine. In the present device the operation of the engine is controlled through the ignition circuit but obviously it could be controlled in other ways as by means of a valve in the fuel line. The governor itself may take various forms but in the form here shown I have mounted in the casing 1 a tubular shaft, or sleeve, 6 which is journaled at its ends in plates, or frame members, 7 and 8 and which has mounted therein a shaft 9 which is held against rotation but is free to move lengthwise within the sleeve. Pivotally mounted on the sleeve 6 are two governor arms 10 which, in the present instance, are pivotally mounted on a band 11 which is clamped about the sleeve or otherwise secured thereto. These arms are provided with toothed segments 12 which extend through slots 13 in the opposite walls of the sleeve 6 and mesh with teeth 14 formed in the shaft 9. These teeth extend entirely about the shaft so as to permit the toothed segments to rotate with the sleeve about the shaft without being disengaged from the teeth in the shaft. The arms 10 are connected one to the other by a spring 15 and are weighted so that when the sleeve is rotated centrifugal force will tend to move the arms outwardly and thus, through the toothed segments, impart lengthwise movement to the shaft 9. I prefer that the arms 10 shall be provided with adjustable flyballs or weights, as shown at 16, which can be set in different positions thereon to control the speed at which the governor will operate to impart lengthwise movement to the shaft 9, the arms being provided with graduations marked to indicate the number of miles per hour at which the vehicle must move to cause the governor to operate the engine controlling device. The sleeve 6 may be rotated through any suitable mechanism but as here shown it is provided with a gear 17 rigidly secured thereto and is connected with the shaft 3 through a suitable train of gearing, including the gears 18, 19, 20 and 21, and the beveled gears 22 and 23.

As has been stated, the engine controlling device may take various forms and it may be connected with the governor in any suitable manner which will enable it to be operated thereby. In the present instance I have shown the engine controlling device as comprising a circuit breaker and closer and, further, have shown the same as designed for use with a high tension ignition system in which the circuit breaker and closer cooperates with a grounding circuit to interrupt the operation of the ignition mechanism. I also prefer to provide a speed indicator which will indicate to the driver at all times the speed at which the vehicle is moving. As here shown, I have mounted an indicator disk, or drum, 24 on the stud 25 carried by a frame member 26, and have provided this indicating disk on its periphery with numbers representing the number of miles per hour and these numbers are so arranged on the disk that the one which is brought into line with the sight opening 2 will represent the speed at which the vehicle is moving. Movement is transmitted from the axially moving shaft 9 to the indicator disk 24 by means of a spiral slot 27 formed in a hub, or sleeve, 28 connected with the disk. An arm 29 extending from the end of the shaft 9 has rigidly secured thereto a pin 30 which travels in the spiral slot 27 and which is held against lateral movement. Consequently, when longitudinal movement is imparted to the shaft 9 rotatory movement will be imparted to the disk 24 and the extent to which the disk is rotated will correspond to the amount of movement imparted to the governor arms 10, which depends upon the speed at which the vehicle is moving. The indicator disk 24 also forms part of the circuit breaker and closer and is provided with two cut-offs or contacts 31 adapted to be brought into engagement with other contacts 32 carried by the frame member 26 and in the present instance connected into the grounding circuit. It will be understood, however, that the circuit breaker and closer may be of any suitable character and if the circuit is other than a grounding circuit the contacts may be so arranged as to maintain the circuit closed and to interrupt the same when the limit of speed is reached. The contacts 31 are preferably adjustably mounted on the disk 24 so that they may be arranged to engage the contacts 32 when the disk 24 is in different positions, thus enabling the device to be adjusted to interrupt the operation of the engine at different speeds, first by adjusting the weights on the governor arms and second by adjusting the contacts on the disk 24. The weights 16 and cut-offs 31 are adjusted commensurate with each other.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a speed controlling mechanism for automobiles and the like, a hollow shaft rotatably mounted in fixed bearings and having openings in the sides thereof, means for rotating said shaft, a rod slidably mounted within said hollow shaft and held against rotation therewith, weighted arms pivotally mounted on said hollow shaft and having parts extending through the openings therein and engaging said rod to impart longitudinal movement thereto, a circuit breaker and closer mounted near one end of said hollow shaft and comprising a member rotatable about an axis parallel with the axis of said shaft, and means actuated by the longitudinal movement of said rod to impart rotatory movement to said rotatable member.

2. In a speed controlling mechanism for automobiles and the like, a hollow shaft rotatably mounted in fixed bearings and having openings in the sides thereof, means for rotating said shaft, a rod slidably mounted within said hollow shaft and held against rotation therewith, weighted arms pivotally mounted on said hollow shaft, having parts extending through the openings therein and engaging said rod to impart longitudinal movement thereto, a circuit breaker and closer mounted near one end of said hollow shaft and comprising a rotatable member, a sleeve secured to said rotatable member and having a spiral slot, and a part carried by said rod, extending beyond the end of said hollow shaft and arranged within said spiral slot to cause rotatory movement to be imparted to said rotatable member by the longitudinal movement of said rod.

3. In a speed controlling mechanism for automobiles and the like, a hollow shaft rotatably mounted in fixed bearings and having openings in the sides thereof, means for rotating said shaft, a rod slidably mounted within said hollow shaft and held against rotation therewith, weighted arms pivotally mounted on said hollow shaft, and having parts extending through the openings therein and engaging said rod to impart longitudinal movement thereto, a circuit breaker and closer comprising a rotatable member mounted at one end of said hollow shaft and having its axis arranged out of line with the axis of said shaft, a hub secured to and rotatable with said rotatable member and having an external spiral groove, and an arm secured to said rod, extending beyond the end of said hollow shaft and having a part extending into the spiral groove of said hub, whereby the longitudinal movement of said rod will impart rotatory movement to said rotatable member.

4. In a mechanism of the character described, a hollow shaft, rotatably mounted in fixed bearings and having openings in the sides thereof, means for rotating said shaft, a rod slidably mounted within said hollow shaft, held against rotation therewith and having a series of ribs extending circumferentially thereof to form teeth, weighted arms pivotally mounted on said hollow shaft and having segmental portions extending through the openings in said hollow shaft and having teeth to engage the teeth on said rod to cause said rod to be moved longitudinally in proportion to the movement of said weighted arms, a circuit breaker and closer mounted near one end of said hollow shaft and comprising a rotatable member, and means actuated by the longitudinal movement of said rod to impart rotatory movement to said rotatable member.

5. In a mechanism of the character described, a hollow shaft rotatably mounted in fixed bearings, means for rotating said shaft, a rod slidably mounted within said hollow shaft and held against rotation therewith, arms pivotally mounted on said hollow shaft and having parts operatively connected with said rod to cause longitudinal movement to be imparted thereto by said arms when the latter move about their axes, weights mounted on said arms and adjustable lengthwise thereof, a spring connecting said arms one to the other to resist their movement about their axes, a circuit breaker and closer mounted near one end of said hollow shaft and comprising a rotatable member, and means actuated by the longitudinal movement of said rod to impart rotatory movement to said rotatable member.

6. In a mechanism of the character described, a hollow shaft rotatably mounted in fixed bearings, means for rotating said shaft, a rod slidably mounted within said hollow shaft and held against rotation therewith, arms pivotally mounted on said hollow shaft and having means for connecting the same with said rod to cause longitudinal movement to be imparted to said rod by the outward movement of said arms under the influence of centrifugal force, weights adjustably mounted on said arms, means to resist the outward movement of said arms, a circuit breaker and closer mounted near one end of said hollow shaft and comprising a rotatable member and contact members adjustably mounted on said rotatable member, and means actuated by the longitudinal movement of said rod to impart rotatory movement to said rotatable member.

In testimony whereof, I affix my signature hereto.

FREDERICK L. OHMER.